Figure 1:
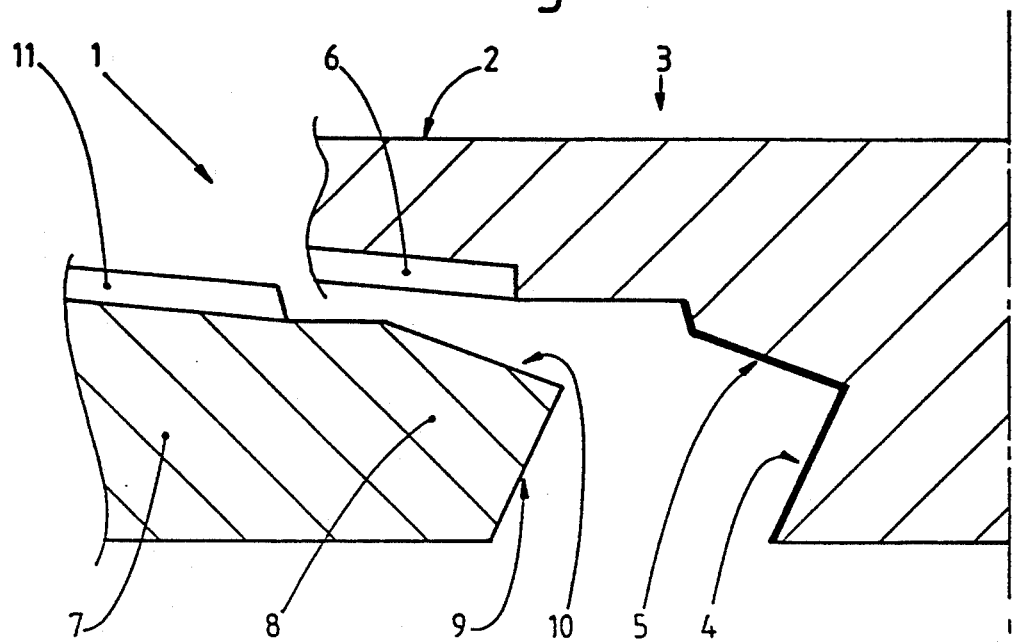

United States Patent [19]
Petelot et al.

[11] Patent Number: 5,253,902
[45] Date of Patent: Oct. 19, 1993

[54] ANTI-SEIZING SURFACE COATING FOR ASSEMBLY MEANS FOR TUBES BY THREADINGS AND PROCESS FOR PRODUCING SUCH A COATING

[75] Inventors: Daniel Petelot, Landrecies; François David, Aulnoye Aymeries, both of France

[73] Assignee: Vallourec Industries, Boulogne-Billancourt, France

[21] Appl. No.: 839,945

[22] Filed: Feb. 20, 1992

[30] Foreign Application Priority Data

Feb. 21, 1991 [FR] France .................... 91 02767

[51] Int. Cl.$^5$ ............................ F16L 7/00
[52] U.S. Cl. ........................ 285/94; 285/333; 285/355; 148/284; 148/277
[58] Field of Search ............ 308/109, DIG. 6; 285/333, 334, 355, 399, 422, 94; 148/284, 277

[56] References Cited

U.S. PATENT DOCUMENTS 4,474,651 10/1984 Yauchi .................... 285/422
4,758,025 7/1988 Fricks ...................... 285/333

FOREIGN PATENT DOCUMENTS 2104919 8/1981 United Kingdom .
2195939 4/1988 United Kingdom .

*Primary Examiner*—Sam Silverberg
*Attorney, Agent, or Firm*—Arnold, White & Durkee

[57] ABSTRACT

The anti-seizing coating according to the invention relates to the protection of the surfaces of male (7) or female (2) components of an assembly means (1) for metal tubes by threadings coming into contact with one another at the time of screwing.

This coating is constituted by a thin lead oxide layer (14) produced by the oxidation of a lead layer, which is itself formed on an underlying layer (13) of a metal such as copper and which has been directly or indirectly deposited beforehand on the surface (4, 5, 9, 10, 11, 6) to be protected against seizing. The invention also relates to the process for producing this coating and the coated assembly means obtained.

24 Claims, 1 Drawing Sheet

ANTI-SEIZING SURFACE COATING FOR ASSEMBLY MEANS FOR TUBES BY THREADINGS AND PROCESS FOR PRODUCING SUCH A COATING

The anti-seizing surface coating for a tube assembly means by threadings according to the present invention relates to the surfaces of male and female components of said assembly means which, at least partly, come into contact with one another when the male component is screwed into the female component. These surfaces are essentially the zones of male and female threadings ensuring a mechanical connection between the two components and preferably at least one annular surface of revolution with respect to the axis of one component, which comes into contact with the corresponding annular surface of the other component. An adequate tightening of the connection by screwing the components with one another makes it possible to bring about a tight metal-metal contact between the thus contacted annular surfaces.

As an example of such an assembly means, French patent 1489013 describes an assembly joint for metal tubes by threadings which are in this case of frustoconical shape, which has annular surfaces ensuring the sealing of the assembly when they come into contact with one another at the end of tightening. In the case of the assembly means shown in FIGS. 3 and 4 of French patent 1489013, the male component 1 has at its front end a concave frustoconical surface 3 of revolution with respect to the axis of the components bearing against the convex frustoconical abutment of the female component 5, which is also of revolution with respect to the axis of said female component 5. Moreover, the chamfered edge forming the convex frustoconical annular surface 4a of the male component 1 tightly bears against the concave frustoconical annular surface 8 of the female component 5. French patent 1489013 does not describe special means making it possible to avoid seizing or jamming during the screwing and tightening of these annular surfaces provided for ensuring a tight connection between the two components of the assembly means. In many cases such seizing can be prevented by a suitable lubricant, such as a compound grease standardized by the American Petroleum Institute. Frequently a prior surface treatment of the components of the junction, such as a phosphatation treatment, aids the wetting of the walls of the components by the lubricant.

Seizing phenomena can also occur at the threadings in areas where the male and female threadings bear against one another, particularly in the case of surfaces exerting a banding action and more specifically with frustoconical threadings.

The lubricants used are generally inadequate for numerous applications. This more particularly relates to the assembly means for tubes made from stainless or refractory steels or stainless or refractory alloys, such as e.g. nickel-based alloys, for which a lubrication is inadequate for ensuring a tight connection without seizing risks. These steels or alloys cannot undergo phosphatation treatments, so that the effectiveness of the lubrication cannot be increased.

Moreover, the use of lubricants such as compound greases also suffers from disadvantages. Thus, it is difficult to correctly distribute them over the entire surface of the assembly means and excessive quantities must be applied to certain areas, whereas in other areas an inadequate quantity or none is applied. These lubricants also tend to fix solid foreign bodies in addition to particles which are already suspended in said mixtures and said foreign bodies can constitute an obstacle to the firm tightening of the components of the assembly. During several screwing-unscrewing cycles with respect to the assemblies, the solid suspended particles in the compound greases accumulate on the threadings and the annular sealing surfaces.

Research has been carried out on the possibility of producing a coating which can be deposited on the surfaces coming into sliding contact of the male or female components of the assembly means of tubes by threadings, which makes it possible to use the assembly means without a compound grease-type lubricant, whereby said threadings can be of a frustoconical nature or not and can e.g. be cylindrical. The possibility of producing this coating has also been investigated with respect to assembly means for tubes made from carbon steel and those made from stainless or refractory steel, or even stainless or refractory alloys, such as e.g. nickel-based alloys.

More particular attention has been paid to the possibility of producing such a coating, the surface state of which permits an easy sliding of the surfaces of the male and female components of the assembly, even under a high pressure corresponding to the tightening phase at the end of screwing. An attempt has been made to obtain a good seal at the annular surfaces, whatever contact shape being for ensuring such a seal. Finally, the possibility has been investigated of producing a coating able to withstand a certain number of screwing-unscrewing cycles of the assembly, without seizing, unbinding or tearing away, in particular at the annular sealing surfaces and without any sealing loss.

The anti-seizing surface coating for assembly means for tubes by threadings according to the invention makes it possible to achieve these results.

This coating is constituted by a thin lead oxide-based layer attached to an intermediate layer of a non-ferrous metal, which is in turn directly or indirectly connected to the surfaces which it must protect. The thickness of the lead oxide layer is approximately 2 to 35 $\mu$m. This layer can be formed from pure lead oxide, but can also contain up to 30% of one or more oxides of other metals, such as tin and zinc.

The intermediate layer which is constituted by at least one metal of the group including copper, nickel and chromium has a thickness of approximately 1 to 30 $\mu$m. Preferably, the intermediate layer is connected to the surface of the component which it must protect by an attachment or fastening layer, which is preferably a nickel layer with a thickness of approximately 0.1 to 5 $\mu$m.

This coating is applied to at least one annular sealing surface of one of the two components of an assembly means for tubes by threadings, in which the threads may or may not be frustoconical. The annular sealing surface can be of very varied shapes and cooperates with a corresponding surface of the other component. This coating can also be applied to one or more other annular surfaces of the same component and can also be applied to the threadings of said component. It is also possible to apply this coating to both components of the assembly means.

The invention also relates to a male or female component of an assembly means for tubes by threadings said male or female component having on at least one part of its surfaces able to come into sliding contact with the corresponding surfaces of the other component, an anti-seizing coating according to the invention and also relates to the corresponding tube assembly means incorporating the male and female components in which at least one male of female component have such an anti-seizing coating.

The invention also relates to a process for producing an anti-seizing coating on at least one surface of a component of an assembly means for tubes by threadings, whereby said surface can come into sliding contact with a corresponding surface of the other component. This process consists of directly or indirectly producing by a known means on the surface of the component an intermediate metal layer of at least one metal from the group including copper, nickel and chromium and in a thickness of approximately 1 to 30 $\mu$m. Onto said intermediate layer is then produced a lead-based metal layer with a thickness of approximately 2 to 30 $\mu$m using a process such as electrolysis. This is followed by an oxidation of the lead into lead oxide by raising the lead-based layer to a temperature between approximately 100° and 350° C., for 1 to 10 h and in an oxidizing atmosphere containing at least 5% oxygen.

The lead oxide-based layer can also contain a maximum of 30% of the total of one or more metal oxides resulting from the oxidation of metals such as tin or zinc contained in the initially deposited lead layer. The thickness of the lead oxide-based layer obtained in this way is between approximately 2 and approximately 35 $\mu$m. Prior to the deposition of the intermediate metal layer, is advantageously produced an attachment or fastening layer of a metal such as nickel and having a thickness of approximately 0.1 to 5 $\mu$m. This layer can be produced by any known means such as electrolysis or chemical displacement from an acid solution of one of its salts. That production of an attachment layer is advantageously preceded by an activation treatment of the surface of the component by a known process such as chemical etching, etching by anodic dissolving or the like.

In a particularly advantageous manner the process according to the invention is applied to the production of an anti-seizing coating, also according to the invention, on at least one annular contact surface of a single component of an assembly means. Experience has shown that the lead oxide-based layer makes it possible to produce, by sliding contact, a non-seizing connection with the corresponding annular surface of the other component such surface being in the as machined state and without the use of any compound grease-type lubricant. The thus formed coating makes it possible to carry out several screwing-unscrewing cycles without any sealing loss at said annular surface.

It is therefore possible to apply the process according to the invention to the production of the anti-seizing coating according to the invention on metal tube sections of limited length provided with female components for assembly means by threadings at their two ends and used for producing very long tube columns, the tubes then being provided at each of their ends with male components corresponding to said female components. Each of these tube sections serves as a coupling sleeve and has anti-seizing coatings according to the invention over the entire surface or solely on those surfaces for sliding on the corresponding male surfaces or on at least one annular sealing surface of each of the two female components of the assembly means, the two corresponding male components located at the ends of the tubes to be assembled being in the as machined state or also being provided with the anti-seizing coating according to the invention.

As stated hereinbefore, the coating according to the invention can be produced on all the surfaces of at least one component of the assembly means coming into contact with the corresponding surfaces of the other component. This is the case with annular zones and in particular those ensuring the sealing and it is also the case of threaded zones. It is also possible to limit the coating to given surfaces by covering the surfaces to be retained as they are with a protective layer, which is removed after producing the coating.

The invention is described in greater detail hereinafter relative to nonlimitative embodiments and the attached drawings, wherein show:

FIG. 1: A diagrammatic, partial and sectional view of the male and female components of a tube assembly means to which the invention is applied for assembling a metal tube column.

Figure 2:
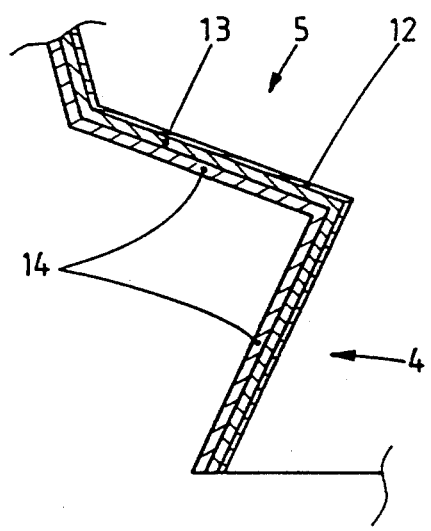

FIG. 2: A much larger scale view of the coating according to the invention covering two adjacent annular sealing surfaces of the female component according to the invention.

FIG. 1 is a partial diagrammatic view of an assembly means for metal tubes by frustoconical threadings used for assembling a tube column. This assembly means 1 comprises a first female component 2 at one of the two ends of a coupling sleeve 3, whereof only the half corresponding to said female component 2 is shown, the other not shown half located beyond the sectional plane Xo perpendicular to the plane of the drawing, having a second female component symmetrical to the first. It can be seen that only two annular surfaces of said female component 2, whose axis is the sleeve axis X1 are represented by their generatrixes 4, 5. Only the small diameter end zone 6 of the female frustoconical threading is shown. The male component 7 constitutes the end of a not shown long tube. This male component has a front end zone 8, which is provided with two annular surfaces, whereof the generatrixes 9, 10 are positioned in such a way that these surfaces come into contact with the surfaces corresponding to the generatrixes 4 and 5 of the female component 2 on assembling the two components. In this case the surfaces 5 and 10 are surfaces ensuring the necessary seal by a metal-metal contact, the surfaces 4 and 9 essentially making it possible to control the screwing torque during the assembly of the tubes. In the case of FIG. 1, only the respectively convex and concave frustoconical surfaces 4 and 5 of the sleeve 3 have been covered with the anti-seizing coating according to the invention and which makes it possible, after screwing and tightening the frustoconical threading 11 of the male component 7 in the frustoconical threading 6 of the female component 2, to come into sliding contact with the respectively concave and convex frustoconical surfaces 9 and 10 of the male component 7, whilst ensuring dry sealing without seizing. Thus, even in the case where the male component 7 is, like the female component, of 13% chromium stainless steel, such as a steel of type 420 (AISI standard), said male component can be dry screwed, i.e. without a lubricant of the compound grease type onto the as machined zones 9 and 10 corresponding to the zones 4 and 5 treated according to the invention of component 2, without seizing and without any sealing loss, even after performing roughly ten screwing-unscrewing cycles under severe conditions, i.e. with high frictional forces or interference between the male and female components.

In most cases, the anti-seizing coating according to the invention is produced not only on the annular surface or surfaces of at least one component of the assembly, but also on the threading of at least one component. In practice, the entire inner surface of the female component 2 or optionally the outer surface of the male component 7 is covered, although in actual fact at the threadings only the active sides, i.e. which are in contact with one another, of the male or female threadings need to be covered with an anti-seizing coating. Finally, in certain difficult cases it is possible to cover with said anti-seizing coating both the surfaces of the male and female components of the assembly means.

The capacity to withstand numerous screwing-unscrewing cycles by the anti-seizing coating according to the invention is largely dependent on the care exercised when performing the process according to the invention.

Details will be given hereinafter of the conditions when applying the coating to frustoconical surfaces 4 and 5 of the female component 2 of FIG. 1. FIG. 2 diagrammatically shows on a much larger scale the layers constituting said coating.

The process is carried out on the two female components of the sleeve 3 after provisionally fitting protective elastomer sheaths on the threaded zones and on the outer wall of the sleeve.

In exemplified manner the process involves the following stages:

1. Producing a nickel attachment layer by immersing the sleeve in an electrolytic bath containing 290 g/l of nickel sulphate, 30 g/l of nickel chloride and 36 /l of boric acid.

Electrolysis is carried out at ambient temperature with a current density of 1 A/dm$^2$ for approximately 3 min. between a nickel anode and the sleeve. The thickness of the nickel attachment layer 12 obtained on the frustoconical surfaces 4 and 5 is approximately 0.6 $\mu$m.

2. Producing an intermediate copper layer by means of an electrolytic bath containing 200 g/l of copper sulphate and 50 g/l of sulphuric acid. Electrolysis is carried out at an ambient temperature with a current density of 3 A/dm$^2$ for approximately 34 min. The thickness of the copper layer 13 obtained is approximately 20 $\mu$m.

3. Producing a lead layer by means of an electrolytic bath containing 90 g/l of lead fluoborate 25 g/l of boric acid and 100 g/l of fluoboric acid with a current density of 3.2 A/dm$^2$ and for 15 minutes.

4. Oxidation of the lead layer by heating at 200° C. for 4 h in a replenished air atmosphere in order to bring about the oxidation of the lead layer into lead oxide Pb O. The thickness of the lead oxide layer 14 obtained is approximately 15 $\mu$m.

The lead oxide layer 14 is, under these conditions, of a perfectly adhering nature and in particular forms a contact layer making it possible to ensure firm tightening by screwing the as machined male component 7 and which has not been lubricated in the lead oxide-covered zones, in the female component 2 of the assembly means 1. Moreover, the thus formed anti-seizing coating makes it possible to carry out at least ten screwing-unscrewing cycles without any detection of the seizing phenomenon, the sealing being ensured under normal conditions.

The process according to the invention can be carried out in a wide variety of operating conditions. In particular, the nickel attachment layer 12 can be produced chemically e.g. by bringing the surfaces to be covered into contact with an acid bath containing a nickel salt. It is also possible to produce the intermediate layer 13 by depositing a metal other than copper, such as nickel or chromium. It is also possible to use for this deposition a process other than electrolysis or a process using electrolytic baths of different composition.

For the deposition of the lead layer, it is also possible to use electrolytic baths of different compositions or use a process other than electrolysis. The transformation of the lead layer into a lead oxide layer 14 can be carried out by oxidation using a gas such as oxygen-enriched air, particularly at the end of oxidation.

As has been stated hereinbefore, it is also possible to deposit a lead-based layer which contains, apart from the lead, limited quantities of other elements such as tin or zinc so that, after oxidation, the lead oxide-based layer 14 can contain up to 30% of one or more oxides of other metals such as tin and zinc.

Numerous variants or modifications are possible to the anti-seizing coating according to the invention and to its production process without passing outside the scope of the invention.

We claim:

1. An anti-seizing coating for a joint of a threaded tubular assembly comprising:
    an intermediate layer formed on a portion of at least one member of said joint, said layer comprising a metal selected from the group consisting of nickel, copper and chromium; and
    a contact layer on top of said intermediate layer, said contact layer comprising at least 70% lead oxide.

2. An anti-seizing coating according to claim 1 wherein said contact layer further comprises up to 30% tin oxide, zinc oxide or combinations thereof.

3. An anti-seizing coating according to claim 1 wherein said contact layer is between 2 and 35 $\mu$m thick.

4. An anti-seizing coating according to claim 1 wherein said intermediate layer is between 1 and 30 $\mu$m thick.

5. An anti-seizing coating according to claim 1 further comprising an attachment layer between said member of said joint and said intermediate layer.

6. An anti-seizing coating according to claim 5 wherein said attachment layer comprises nickel and is between 0.1 and 5 $\mu$m thick.

7. An anti-seizing coating according to claim 6 wherein said portion of said member comprises an annular surface on said member which mates with a corresponding annular surface on the other member of said joint.

8. An anti-seizing coating according to claim 7 wherein said coating is also formed on said corresponding annular surface of said other member of said joint.

9. An anti-seizing coating according to claim 7 wherein said coating is additionally formed on at least part of threadings on one of said members.

10. An anti-seizing coating according to claim 9 wherein said threadings are frustoconical threadings.

11. A process for producing an anti-seizing coating for a joint of a threaded tubular assembly having surfaces that come into sliding contact, said process comprising:

depositing on a surface of a first member of said joint that comes into sliding contact with a surface of a second member of said joint an intermediate layer comprising a metal selected from the group consisting of copper, nickel and chromium;

depositing a further layer comprising lead on top of said intermediate layer; and heating said layers at a temperature between 100° and 350° C. for a period from 1 to 10 hours in the presence of an oxygen containing gas to transform the lead in said further layer into lead oxide to form a contact layer comprising at least 70% lead oxide.

12. A process according to claim 11 further comprising depositing a metal attachment layer 0.1 to 5 μm thick on said surface prior to depositing said intermediate layer.

13. A process according to claim 12 wherein said attachment layer comprises nickel.

14. A process according to claim 11 wherein said intermediate layer and said further layer are deposited by electrolysis.

15. A process according to claim 11 wherein said further layer further comprises tin, zinc or combinations thereof.

16. A tubular assembly having male and female members forming a threaded joint wherein at least one of said members includes a portion having an anti-seizing coating thereon, said coating comprising:

an intermediate layer comprising a metal selected from the group consisting of nickel, copper and chromium; and a contact layer on top of said intermediate layer, said contact layer comprising at least 70% lead oxide.

17. A tubular assembly according to claim 16 wherein said contact layer additionally comprises up to 30% tin oxide, zinc oxide or combinations thereof.

18. A tubular assembly according to claim 16 further comprising an attachment layer between said member and said intermediate layer.

19. A tubular assembly according to claim 18 wherein said attachment layer comprises a 0.1 to 5 μm thick layer of nickel.

20. A tubular assembly according to claim 16 wherein said contact layer is 2 to 35 μm thick.

21. A tubular assembly according to claim 16 wherein said intermediate layer is 1 to 30 μm thick.

22. A tubular assembly according to claim 16 wherein said portion comprises an annular surface on said member which mates with a corresponding annular surface on the other member of said joint.

23. A tubular assembly according to claim 16 wherein said portion further comprises at least part of the threads which come into sliding contact with threads on the other member of said joint.

24. A tubular assembly according to claim 16 wherein said threaded joint has frustoconical threadings.

* * * * *

UNITED STATES PATENT AND TRADEMARK OFFICE
CERTIFICATE OF CORRECTION

PATENT NO. : 5,253,902
DATED : October 19, 1993
INVENTOR(S) : Petelot et al.

It is certified that error appears in the above-indentified patent and that said Letters Patent is hereby corrected as shown below:

Column 6, line 52, "claim 6" should be -- claim 1 --.

Signed and Sealed this

Twenty-first Day of June, 1994

Attest:

BRUCE LEHMAN

*Attesting Officer*                *Commissioner of Patents and Trademarks*